(12) United States Patent
Chevalier (10) Patent No.: US 9,225,238 B2
(45) Date of Patent: Dec. 29, 2015

(54) MULTIPLE LEVEL CHARGE PUMP GENERATING VOLTAGES WITH DISTINCT LEVELS AND ASSOCIATED METHODS

(71) Applicant: STMicroelectronics International N.V., Amsterdam (NL)

(72) Inventor: Laurent Chevalier, Grenoble (FR)

(73) Assignee: STMicroelectronics International N.V., Amsterdam (NL)

( * ) Notice: Subject to any disclaimer, the term of this patent is extended or adjusted under 35 U.S.C. 154(b) by 5 days.

(21) Appl. No.: 14/461,780

(22) Filed: Aug. 18, 2014

(65) Prior Publication Data

US 2015/0055805 A1 Feb. 26, 2015

(30) Foreign Application Priority Data

Aug. 20, 2013 (EP) .................................... 13368024

(51) Int. Cl.
*H02M 3/07* (2006.01)
*G05F 3/02* (2006.01)
*G06F 3/16* (2006.01)
*H02M 1/00* (2007.01)

(52) U.S. Cl.
CPC . *H02M 3/07* (2013.01); *G05F 3/02* (2013.01); *G06F 3/165* (2013.01); *H02M 2001/009* (2013.01); *H02M 2003/071* (2013.01); *H02M 2003/072* (2013.01)

(58) Field of Classification Search
None
See application file for complete search history.

(56) References Cited

U.S. PATENT DOCUMENTS

| | | | | |
|---|---|---|---|---|
| 2007/0252640 | A1* | 11/2007 | Lin | G11C 5/145 327/541 |
| 2008/0036542 | A1* | 2/2008 | Chen | H03F 1/0211 330/297 |
| 2008/0044041 | A1* | 2/2008 | Tucker | H02M 3/07 381/120 |
| 2010/0176872 | A1* | 7/2010 | Saikusa | H02J 7/0044 327/536 |
| 2010/0321099 | A1 | 12/2010 | Hsieh et al. | |

FOREIGN PATENT DOCUMENTS

EP 2469694 A1 6/2012
WO WO-2012025232 A2 3/2012

OTHER PUBLICATIONS

European Search Report and Written Opinion for EP 13368024.9 mailed Jan. 28, 2014 (8 pages).
Kei Eguchi: "Design of a Hybrid Input Charge-Pump Utilizing Waste Heat and Its Thermal Analysis Method," Intelligent Networks and Intelligent Systems (ICINIS), 2011 4th International Conference on, IEEE, Nov. 1, 2011, pp. 137-140, XP032075132.

* cited by examiner

*Primary Examiner* — Paul Huber
(74) *Attorney, Agent, or Firm* — Gardere Wynne Sewell LLP (57) ABSTRACT

A multi level charge pump circuit may be associated with at least two power supplies, and may provide at least four levels of positive and negative voltage. The multi level charge pump may include first and second fly capacitors, and first and second tank capacitors. A plurality of PMOS transistors and NMOS transistors may allow generation of two high voltage levels and two low voltage levels for the multi level charge pump, the low voltage levels being derived from a charging of the two fly capacitors in series. This multi level charge pump may be embodied in an audio device within a platform without a dedicated SMPS circuit.

17 Claims, 7 Drawing Sheets

MULTIPLE LEVEL CHARGE PUMP GENERATING VOLTAGES WITH DISTINCT LEVELS AND ASSOCIATED METHODS

CROSS REFERENCE TO RELATED APPLICATION

This application claims the priority benefit of the EP Patent Application Number 13368024.9, filed on Aug. 20, 2013, entitled "Multiple level charge pump generating four voltages with four distinctive levels, and method for the same," which is hereby incorporated by reference to the maximum extent allowable by law.

TECHNICAL FIELD

This disclosure relates to the field of electronic circuits and more particularly to a switched mode power supply circuit using a multiple output charge pump with different output levels of positive and negative voltages.

BACKGROUND ART

The development of portable electronic equipment, in general, and mobile phones, in particular, has revealed a significant interest for the use of Switched Mode Power Supply (SMPS) systems.

Indeed, such SMPS systems, contrary to linear regulators, achieve a high efficiency—on the order of 90 or 95%—which may be well beyond what is allowed by linear voltage regulator. Therefore, electronic products manufacturers tend to use SMPS systems in a wide variety of portable devices, including mobile phones, MP3 players, Portable Device Assistant, etc.

Consider, for instance, the particular case of mobile phones. These devices tend to incorporate many multimedia functions, including specific audio capabilities. A mobile phone may now serve as a MP3 player and thus incorporate an audio amplifier which, for the purpose of saving the battery life, may be class AB or even class G, using a voltage supply which is adjusted in accordance to the level of the audio signal to amplify.

Figure 1:
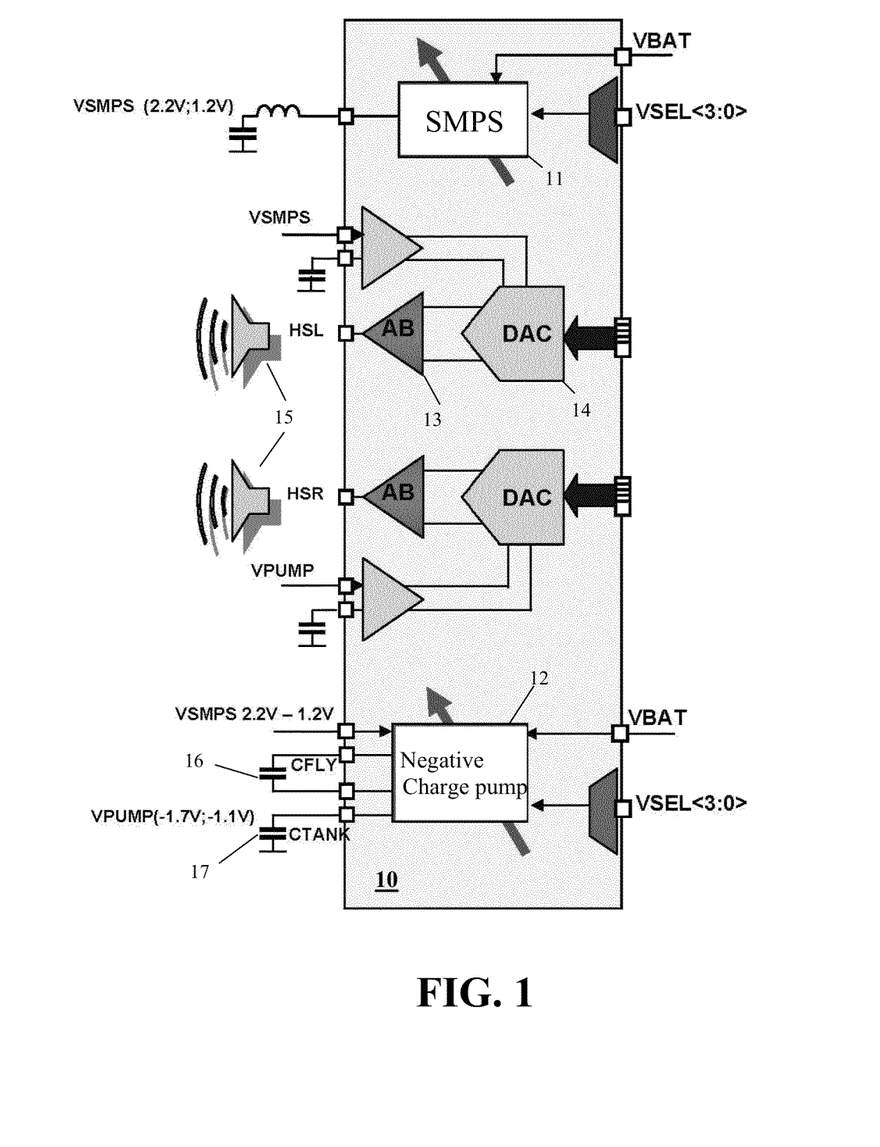
FIG. 1 illustrates the schematic view of a first system based on the use of a dedicated SMPS unit.

FIG. 1 illustrates a schematic view of such an audio device 10 intended to drive a headset 15, comprising two drivers, using a stereo AB class power amplifier 13. Power amplifier 13 receives analog signals which are converted by DAC 14 into analog form from the digital audio files stored within memory (not illustrated). The powering of the class AB amplifier is achieved by the combination of a dedicated SMPS unit 11 providing the positive voltage, for example a voltage between 2.2V and 1.2V, in accordance with the amplitude of the analog audio signal to be amplified. In addition, a negative charge pump 12 coupled to an appropriated fly capacitor 16 and tank capacitor 17 provides the negative voltage.

This structure achieves, thanks to the combination of the SMPS 11 and the negative charge pump 12, a very high efficiency on the whole range of amplitude on the audio signal. Indeed, the envelope detection of the audio signal gives the code for the control bits (VSEL<3:0>) to adjust the both SMPS and Negative Charge pump output voltages according to the audio signal.

This system achieves the possibility of creating a true H CLASS supply modulation with several levels with a real gain of efficiency on various levels. A limitation of such a system results from its use of a dedicated SMPS unit, having a dedicated and expensive coil in addition to the additional area required on the semiconductor substrate.

Figure 2:
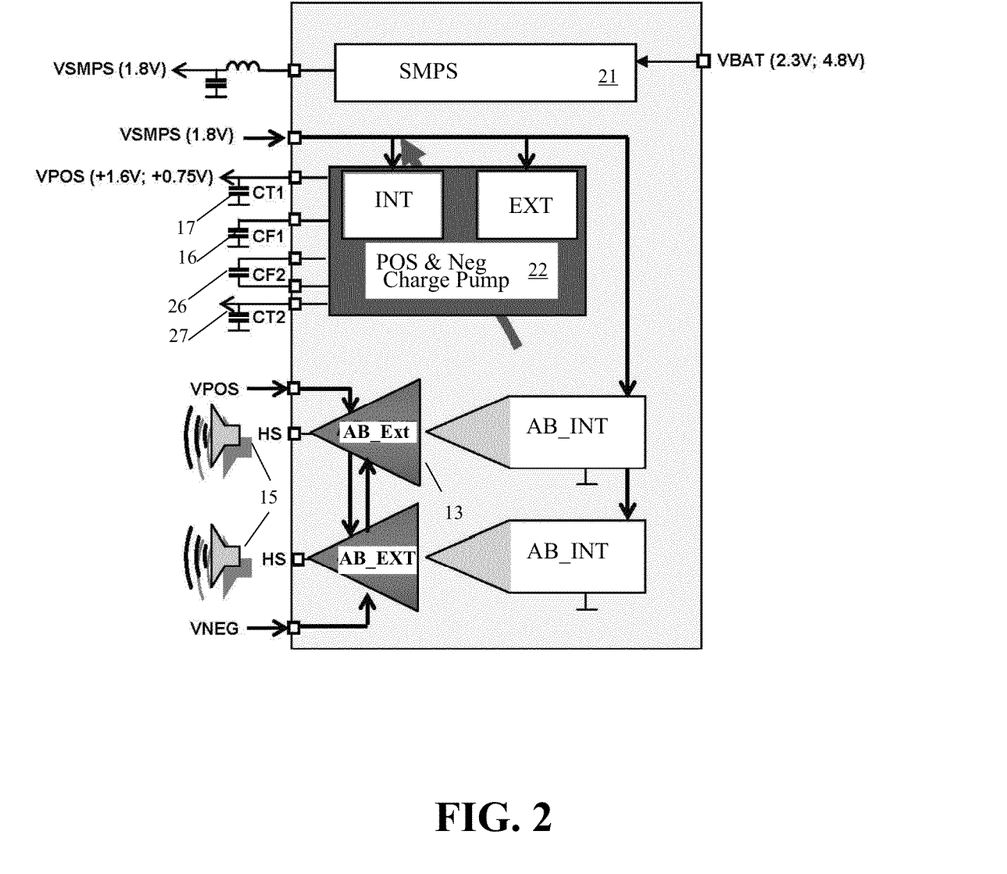
FIG. 2 illustrates a second technique which can take advantage of an existing SMPS unit to create a G Class audio amplifier.

A second system is described in U.S. Pat. Pub. 2013/0214,852, assigned to the assignee of the present disclosure, entitled "Dual output charge pump generating two voltage values with two distinctive levels and control method thereof", which is represented in FIG. 2, and hereby incorporated by reference in its entirety. This second system allows removal of the costly dedicated SMPS device of FIG. 1 by using a generic SMPS device already present in the chip or in the platform (for instance a specific SMPS powering Input/output interface with a fixed voltage of 1.8 Volts). Thanks to a dual output charge pump (positive and negative), using a second fly capacitor, the possibility of generating two levels of positive voltages (VDD and VDD/2) and corresponding two levels of negative voltages (−VDD and −VDD/2) is achieved.

FIG. 2 illustrates the schematical view of an audio device which would implement the second system known from U.S. Ser. No. 13/816,349. For the sake of conciseness, the elements which are common with those of FIG. 1 bear the same numerals references (headset 13, amplifier 13, fly and tank capacitor 16 and 17). The SMPS circuit 21 provides a fixed output voltage (1.8V for instance), which is used for powering a dual positive and negative charge pump 22 associated with two fly capacitors, respectively 16 and 26, and two tank capacitors, respectively 17 and 27.

The second system depicted in FIG. 2 achieves the possibility of providing two voltage levels (±1.6V/±0.75V) and thus a true G-Class system, without using dedicated SMPS and thus reducing the manufacturing costs.

However, it is still desirable to provide better efficiency and performance. Therefore, further developments in this area are desired.

SUMMARY

The present disclosure may provide a SMPS voltage supply circuit which advantageously combines great efficiency and versatility for supplying a specific Class H audio amplifier.

The present disclosure may also provide a SMPS voltage supply system which includes a dual voltage charge pump allowing four different levels of positive and negative voltages, useful for embodying an H class audio amplifier.

The present disclosure may additionally provide a low cost audio device which can be used in any generic platform and which can be powered by the existing SMPS power unit.

The present disclosure may further provide a low cost mobile telephone which includes an audio device with audio amplifiers which can be powered without a specific SMPS circuit.

These and other objects of the disclosure may be achieved by a multi level charge pump circuit for generating multiple positive and negative voltage levels with a very high efficiency. The circuit may include a dual output charge pump having positive and negative outputs respectively coupled to first and second tank capacitors. The circuit may also include a first fly capacitor to transfer a charge into the first tank capacitor, and a second fly capacitor to transfer a charge into the second tank capacitor. The circuit may further include a set of switches for coupling or decoupling the first and second fly capacitors in series, for performing a charge transfer from the power supply into the first and second fly capacitors, and for further performing adequate charge transfer to the first and second tank capacitors for generating positive and negative voltage levels.

In the multi level charge pump circuit, the dual output charge pump may be configured to be associated with at least a first and a second power supply (Vdd1, Vdd2). The multi level charge pump circuit may also include a set of switches for performing adequate charge transfer for generating at least four positive voltage levels (Vdd1, Vdd2, Vdd1/1 and Vdd2/2) and four negative voltages (−Vdd1, −Vdd2, −Vdd1/1 and −Vdd2/2).

The first and a second power supply (Vdd1, Vdd2) may be generated by Switched Mode Power Supply (SMPS) generating fixed voltages (Vdd1, Vdd2). In one embodiment, the first fly capacitor may have a first terminal and a second terminal, and the second fly capacitor may have a first and a second terminal coupled to ground. The first tank capacitor may have a first and a second terminal, with the second terminal being coupled to ground. The second tank capacitor may have a first and a second terminal, with the second terminal being coupled to ground.

The multi level charge pump may also include a first PMOS transistor having a source terminal, a drain terminal, and a gate terminal. The source terminal of the first PMOS transistor may be coupled to the first power supply (Vdd1), the drain terminal of the first PMOS transistor may be coupled to a first terminal of the first fly capacitor, and the gate terminal may receive a first control signal (NPH1L).

A second PMOS transistor may have a source terminal, a drain terminal, and a gate terminal. The source of the second PMOS transistor may be coupled to the second power supply (Vdd2), the drain of the second PMOS transistor may be coupled to the first terminal of the first fly capacitor, and the gate terminal may receive a second control signal (NPH2L).

A first NMOS transistor may have a source terminal, a drain terminal, and a gate terminal. The source terminal of the first NMOS transistor may be coupled to ground, the drain terminal of the first NMOS transistor may be coupled to the first terminal of the first fly capacitor, and the gate terminal of the first NMOS transistor may receive a third control signal (NPH2L).

A second NMOS transistor may have a source terminal, a drain terminal, and a gate terminal. The source terminal of the second NMOS transistor may be coupled to a reference voltage, for example ground, the drain terminal of the second NMOS transistor may be coupled to the second terminal of the first fly capacitor, and the gate terminal may receive a fourth control signal (NPH1H).

A third NMOS transistor may have a source terminal, a drain terminal, and a gate terminal. The source terminal of the third NMOS transistor may be coupled to the second terminal of the first fly capacity, the drain terminal of the third NMOS transistor may be coupled to the first terminal of the first tank capacitor—which is in turn coupled in parallel to a load, and the gate terminal of the third NMOS transistor may receive a fifth control signal (NPH2H).

A fourth NMOS transistor may have a source terminal, a drain terminal, and a gate terminal. The source terminal of the fourth NMOS transistor may be coupled to the second terminal of the first fly capacitor, the drain terminal of the fourth NMOS transistor may be coupled to the first terminal of the second fly capacitor, and the gate terminal may receive a sixth control signal (PPS2L).

A third PMOS transistor may have a source terminal, a drain terminal, and a gate terminal. The source terminal of the third PMOS transistor may be coupled to the first power supply (Vdd1), the drain terminal of the third PMOS transistor may be coupled to a first terminal of the second tank capacitor, and the gate terminal may receive a seventh control signal (PPH1L).

A fourth PMOS transistor may have a source terminal, a drain terminal, and a gate terminal. The source terminal of the fourth PMOS transistor may be coupled to the second power supply (Vdd2), the drain terminal of the fourth PMOS transistor may be coupled to the first terminal of the second tank capacitor, and the gate terminal may receive an eighth control signal (PPH2L).

A fifth PMOS transistor may have a source terminal, a drain terminal, and a gate terminal. The source terminal of the fifth PMOS transistor may be coupled to the first terminal of the second fly capacitor, the drain terminal of the fifth PMOS transistor may be coupled to the first terminal of the second tank capacitor (34)—which is in turn coupled in parallel to the load (151), and the gate terminal of the fifth PMOS transistor may receive a ninth control signal (PPH3L).

The multi level charge pump circuit may have control circuit to generate the first, second, third, fourth, fifth, sixth, seventh, eighth and ninth control signal so as to generate first (Vdd1), second (Vdd2), third (Vdd1/2), fourth (Vdd2/2), fifth (−Vdd2/2), sixth (−Vdd1/2), seventh (−Vdd2), and eighth (−Vdd1) voltage values, which may include four positive and negative voltages.

In one embodiment, the multi level charge pump circuit may power an H Class audio device. More particularly, the multi level charge pump circuit may be used for a mobile telephone with audio features.

This disclosure also provides a method for operating the multi level charge pump circuit, wherein the first (Vdd1) and eighth (−Vdd1) voltages are generated by the following steps. The positive portion of the multi voltage charge pump may operate by switching ON the third PMOS transistor so that the first voltage (Vdd1) is coupled to the first terminal of tank capacitor. The negative portion of the multi level voltage charge pump may operate by, in a first phase, by switching ON the first PMOS transistor and the second NMOS transistor to charge the first fly capacitor, and, in a second phase, by switching OFF the first PMOS transistor and the second NMOS transistor and by switching ON the first NMOS transistor and the third NMOS transistor, so as to draw current to the ground.

In one embodiment, the second (Vdd2) and seventh (−Vdd/2) voltages may be generated by the following. The positive portion of the multi voltage charge pump may operate by switching ON the fourth PMOS transistor so that the second voltage (Vdd2) is coupled to the first terminal of the second tank capacitor (34). The negative portion of the multi level voltage charge pump may operate by switching ON the second PMOS transistor and the second NMOS transistor to charging the first fly capacitor, and, in a second phase, by switching OFF the first PMOS transistor and the second NMOS transistor and by switching ON the first NMOS transistor and the third NMOS transistor so as to draw current to the ground.

More particularly, the third (Vdd1/2) and sixth (−Vdd1/2) voltages may be generated in a first phase, by switching the first PMOS transistor and the fourth NMOS transistor on while other transistors are switched off so as to establish a series coupling of the two fly capacitors between the first supply voltage (Vdd1) and the ground. The third and sixth voltages may be generated in a second phase by, for the positive portion of the multi voltage charge pump, switching the fifth PMOS transistor on so as to perform a charge transfer from the second fly capacitor into the second tank capacitor, and for the negative portion, switching the first NMOS transistor and the third NMOS transistor so as to achieve a charge transfer from the first fly capacitor into the first tank capacitor.

In one embodiment, the fourth (Vdd2) and fifth (−Vdd2) voltages may be generated by, in a first phase, switching the second PMOS and the fourth NMOS transistor on while other transistors are switched off so as to establish a series coupling of the two fly capacitors between the second supply voltage (Vdd2) and the ground. In a second phase, the fourth and fifth voltages may be generated by, for the positive portion of the multi voltage charge pump, switching the fifth PMOS transistor on so as to perform a charge transfer of the second fly capacitor into the second tank capacitor, and for the negative portion of the multi voltage charge pump, the first NMOS transistor and the third NMOS transistor may be switched on so as to achieve a charge transfer from the first fly capacitor into the first tank capacitor.

In one embodiment, the multi level charge pump may be used for a mobile telephone including an audio system. In this application, the multi level charge pump circuit may include a DAC for converting a digital audio file into analog signals, and an H class audio amplifier powered by the multi-level charge pump. The playing of the audio file may be delayed by a processor which performs processing of the audio file to generate the first, second, third, fourth, fifth, sixth, seventh, eighth and ninth control signal to generate a series of four positive and negative voltages.

The disclosure also proposes a multilevel negative charge pump circuit which may include a fly capacitor having a first terminal and a second terminal, and a tank capacitor having a first and a second terminal. The second terminal of the fly capacitor may be coupled to ground. A first PMOS transistor may have a source terminal, a drain terminal, and a gate terminal. The source terminal of the first PMOS transistor may be coupled to the first power supply (Vdd1), the drain of the first PMOS transistor may be coupled to a first terminal of the fly capacitor, and the gate terminal may receive a first control signal (NPH1L).

A second PMOS transistor of the multilevel negative charge pump circuit may have a source terminal, a drain terminal, and a gate terminal. The source terminal of the second PMOS transistor may be coupled to the second power supply (Vdd2), the drain terminal of the second PMOS transistor may be coupled to the first terminal of the fly capacitor (32), and the gate terminal may receive a second control signal (NPH2L).

A first NMOS transistor of the multilevel negative charge pump circuit may have a source terminal, a drain and a gate terminal. The source terminal of the first NMOS transistor may be coupled to ground, the drain terminal of the first NMOS transistor may be coupled to the first terminal of the fly capacitor, and the gate terminal of the first NMOS transistor may receive a third control signal (NPH2L).

A second NMOS transistor of the multilevel negative charge pump circuit may have a source terminal, a drain terminal, and a gate terminal. The source terminal of the second NMOS transistor may be coupled to ground, the drain terminal of the second NMOS transistor may be coupled to the second terminal of the fly capacitor, and the gate terminal may receive a fourth control signal (NPH1H).

A third NMOS transistor of the multilevel negative charge pump circuit may have a source terminal, a drain terminal, and a gate terminal. The source terminal of the third NMOS transistor may be coupled to the second terminal of the fly capacitor, the drain terminal of the third NMOS transistor may be coupled to the first terminal of the tank capacitor— which is in turn coupled in parallel to a load, and the gate terminal of the third NMOS transistor may receive a fifth control signal (NPH2H).

This arrangement may allow for the generation of different negative voltage levels by successive charge transfer from either the first power supply (Vdd1) or the second power supply (Vdd2) into the fly capacitor (32), followed by a corresponding transfer of charge into the tank capacitor (31).

BRIEF DESCRIPTION OF THE DRAWINGS

Other features of one or more embodiments will appear from the following description of embodiments, with reference being made to the accompanying drawings, wherein.

DETAILED DESCRIPTION

There will now be described particular embodiments of an audio device, for instance for a mobile telephone platform, which can incorporate an efficient audio device which does not use a specific dedicated SMPS circuit, yet can achieve a true H Class audio amplifier with low additional costs.

Figure 3:
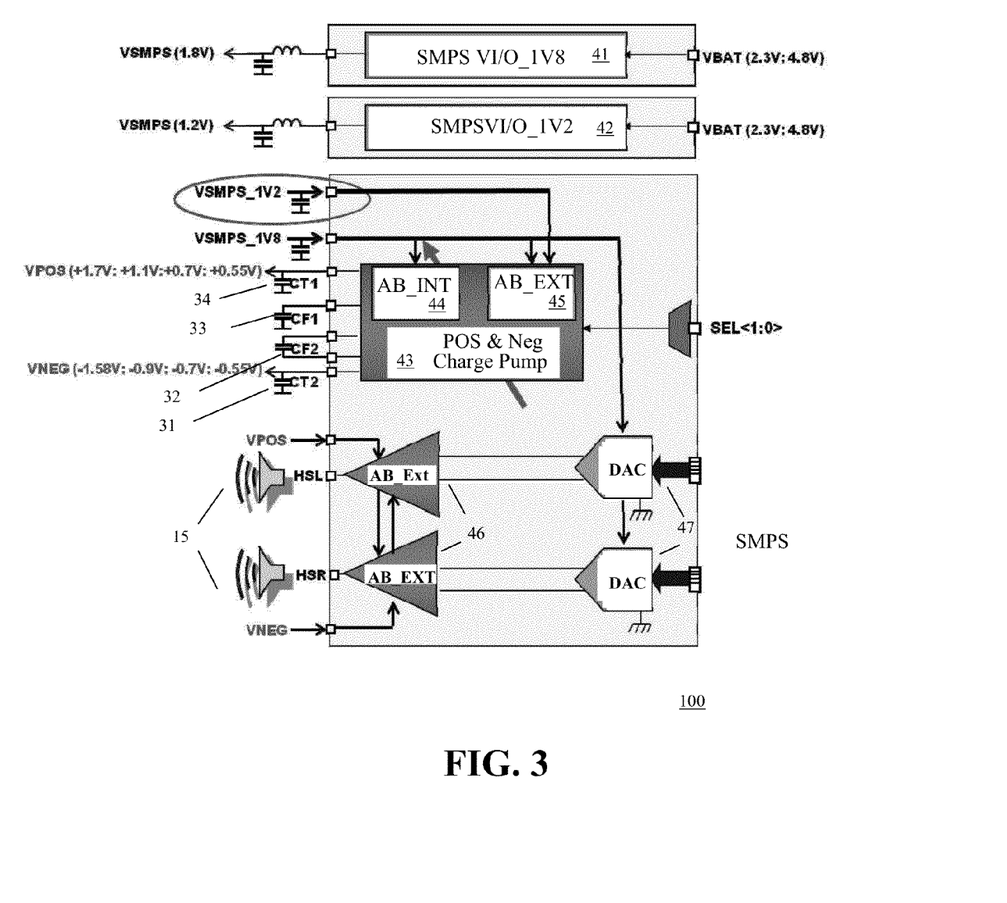
FIG. 3 illustrates the general architecture of one embodiment.

FIG. 3 illustrates one embodiment of a device 100 which is powered by a power supply voltage VBAT (between 2.3V and 4.8V in accordance with the status of the battery (not shown)). For the sake of illustration, device 100 is assumed to include two conventional SMPS circuits 41 and 42, which are associated with appropriate external components, i.e. coil and capacitor, to generate a fixed output voltage, e.g. 1.8 Volts or 1.2 Volts according to the case.

SMPS circuits 41 and 42 may be embodied by any SMPS circuit. Furthermore, one could arrange more than two SMPS circuits so as to produce a higher number of fixed output voltages. For the sake of illustration, consider the case of two specific SMPS circuits 41 and 42, respectively SMPS VI/O__1V8 and SMPS VI/O__1.2V, which are assumed to provide two respective voltages (1.8V; 1.2V) used for powering some dedicated Input/Output interfaces.

Device 100 is arranged to offer specific audio capabilities and couplings to two loudspeakers or to a headset 15. For that purpose, device 100 may include specific audio circuits, e.g. a AB class audio amplifier embodied by internal block 44 (AB_INT) and external blocks 45-46 (AB_EXT), with the audio amplifier being arranged to drive first and second loudspeakers 15, or a headset, in accordance with analog signals generated by DAC circuits 14, for instance resulting from a digital audio file stored within the memory (not represented in FIG. 3).

The embodiment includes, in addition to the pre-existing SMPS, a dual voltage charge pump 43 which is powered by SMPS VI/O__1V8 circuit 41 and by counterpart SMPSVI/O1V2 circuit 42.

In the example being considered, and illustrated in FIG. 3, the dual output CHARGE_PUMP provides both modulated supplies (POSITIVE and NEGATIVE) in the ranges of ±1.7V, ±1.1V, ±0.7V, and ±0.5V which are used for supplying voltage to the audio amplifier, taking into account the voltage losses existing in the MOS switches.

A charge pump may be based on one capacitor, known as a "fly" capacitor, which serves for the transfer of charge to one or more "tank" or "reservoir" capacitors.

In the embodiment shown in FIG. 3, dual voltage charge pump 43 is associated to four external capacitors, respectively first and second fly capacitors 32 and 33, and first and second reservoir or tank capacitors 31 and 34.

In order to increase the amplitude of the audio signal, the charge pump may provide a set of two high output voltages (±1.7V; ±1.1V) to the audio amplifier with the structure below. However, in order to reduce power consumption for small audio signals, a second set of two low output voltages (±0.7V and ±0.5V) may be generated by dual charge pump 12 which will now be described with reference with FIG. 4.

The components which are involved in the generation of the negative voltage supply current to load 150 will now be described first with respect to FIG. 4.

Figure 4:
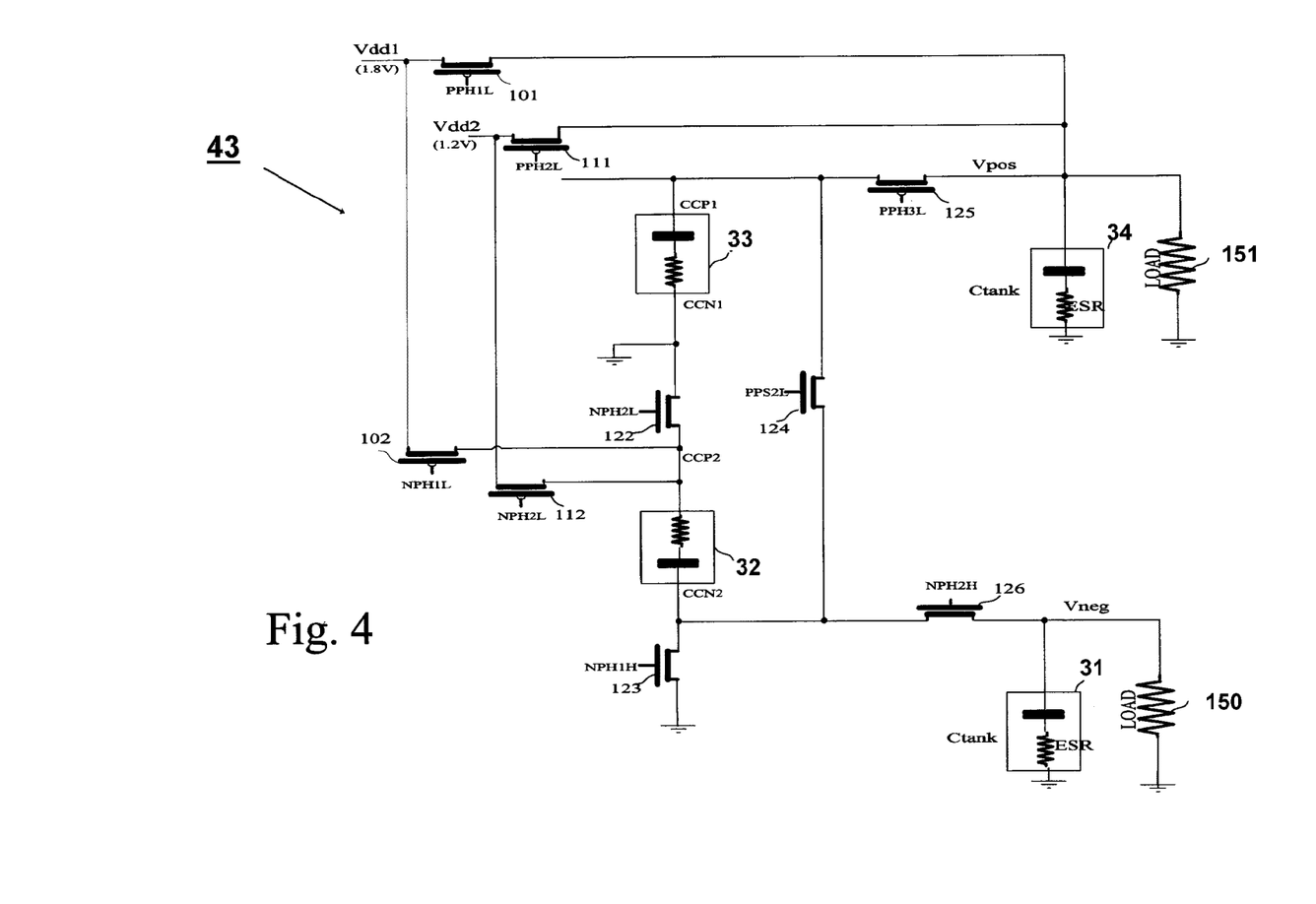
FIG. 4 illustrates an embodiment of a circuit achieving four distinctive positive and negative voltages for use in an H class audio amplifier.

With respect to FIG. 4, one sees that charge pump 43 includes a first PMOS transistor 102 having source and drain terminals, and a gate terminal which receives a control signal NPH1L. The source terminal of PMOS transistor 102 is coupled to the first source of voltage Vdd1 generated by the first SMPS circuit (and assumed to receive the supply voltage having the higher value), while the drain terminal is coupled to a first terminal (CCP2) of the first fly capacitor 32 (represented in FIG. 4 with its internal resistor) and also to the drain terminal of a first N MOS transistor 122 having a source terminal coupled to ground. Transistor 122 has a gate terminal which receives a control signal NPH2L. Fly capacitor 32 has a second terminal (CCN2) which is coupled to the drain terminal of a second NMOS transistor 123 that has a source terminal coupled to the ground and a gate terminal for receiving a control signal NPH1H.

Charge pump 43 comprises a third NMOS transistor 126 having source and drain terminals, and a gate terminal receiving a control voltage NPH2H. The source terminal of transistor 126 is coupled to the second terminal (CCN2) of the first fly capacitor 32, while the drain terminal of transistor 126 is coupled to the first terminal of tank capacitor 31 (the losses of which are represented as a resistor in FIG. 4), with the tank capacitor having its other end coupled to ground. The tank capacitor 31 is coupled in parallel to a negative load 150.

Charge pump 43 also includes a second PMOS transistor 112 having source and drain terminals, and a gate terminal which receives a control signal NPH2L. The source terminal of PMOS transistor 112 is coupled to the second voltage source Vdd2 generated by the second SMPS circuit (and providing the supply voltage with the lower level), while the drain terminal is coupled to first terminal (CCP2) of first fly capacitor 32 as well as to the drain of first NMOS transistor 122.

The components which were described above may be used for providing a charge pump generating a negative voltage. However, to provide positive voltage levels, additional components are combined which will now be described below.

Charge pump 43 further includes a third PMOS transistor 101 having source and drain terminals as well as a gate terminal for receiving a control signal PPH1L. The source terminal of PMOS transistor 101 is coupled to Vdd1 (generated by SMPS VI/O_1V8 producing 1.8 Volt) while the drain terminal is coupled to a first terminal of a second tank capacitor 34. Tank capacitor 34 (the losses of which are represented by a ESR resistor coupled in series) has a second terminal which is coupled to the ground. A load 151 is coupled in parallel to the tank capacitor 34 which represents the current load of the audio driver.

Charge pump 43 further includes a fourth PMOS transistor 111 having source and drain terminals as well as a gate terminal for receiving a control signal PPH2L. The source terminal of PMOS transistor 111 is coupled to second voltage Vdd2 (assumed to receive the supply voltage having the lower value) generated by the second fixed SMPS (SMPS VI/O_1V2 producing 1.2 Volt) while the drain terminal is coupled to the first terminal of tank capacitor 34.

Charge pump 43 further comprises a fourth NMOS transistor 124 which has source and drain terminals, and a gate terminal for receiving a control signal PPS2L. The source terminal of NMOS transistor 124 is coupled to the second terminal (CCN2) of first fly capacitor 32 while the drain terminal is coupled to a first terminal of second fly capacitor 33 (the losses of which are illustrated by a resistor in FIG. 4), the second terminal of which is coupled to ground.

Charge pump 43 further comprises a fifth PMOS transistor 125 which has source and drain terminals, and a gate terminal for receiving a control signal PPH3L. The source terminal of PMOS transistor 125 is coupled to the first terminal (CCP1) of second fly capacitor 33, while the drain terminal of that transistor is coupled to the first terminal of tank capacitor 34.

Figure 5:
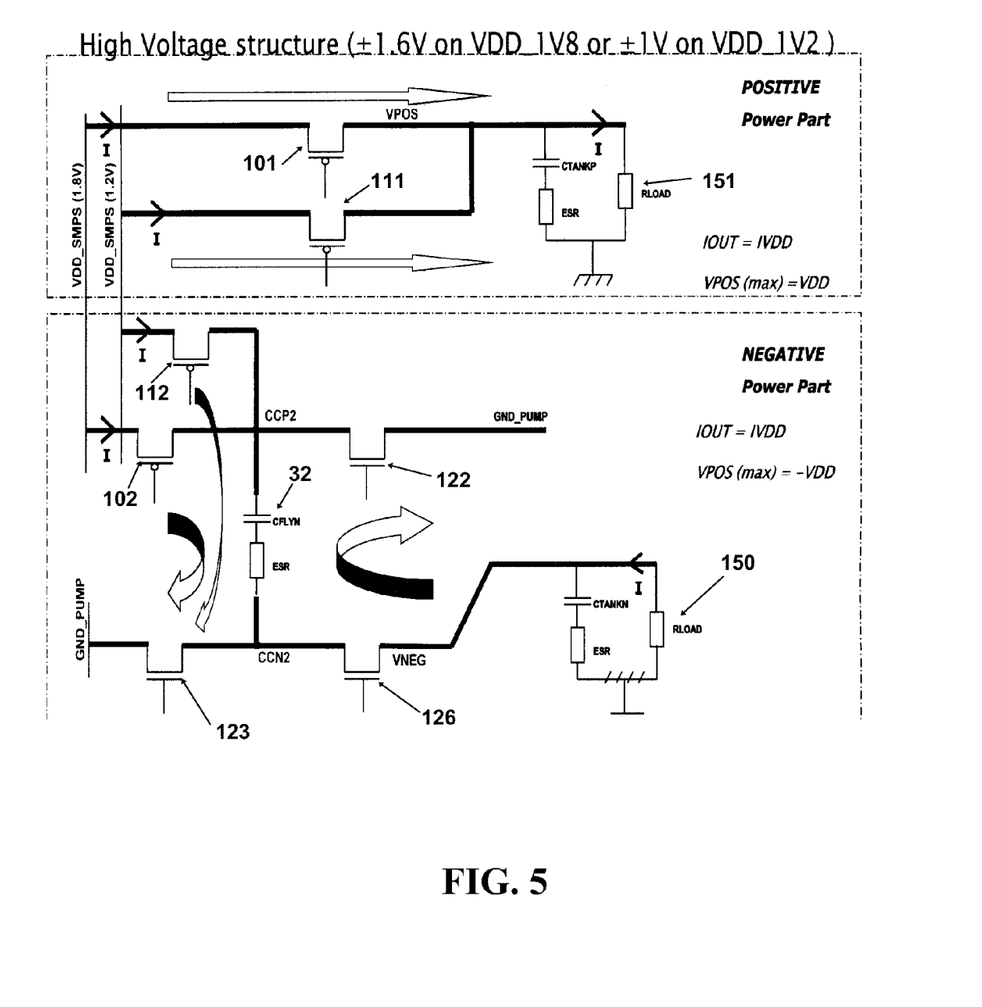
FIG. 5 illustrates the operation of the circuit of FIG. 4 to generate the two higher voltages.

Those of skill in the art will appreciate that the circuit is capable of generating various positive Vpos and negative Vneg voltages which may be used for driving a AB class amplifier, or even a H class amplifier thanks to the possibility of generating, as will become apparent hereinafter with the subsequent drawings of FIGS. 5 and 6, four distinctive positive and four distinctive negative voltages.

Charge pump 43 is arranged to provide, from the fixed positive voltage Vdd1 (assumed to have the higher voltage) generated by first SMPS (VDD_1.V8), the set of voltages ±1.7V.

To achieve this, the dual charge pump operates as follows. Regarding the positive portion of the dual voltage charge pump, one can see that PMOS transistor 101 is switched ON (while transistors 111 and 125 are switched OFF), so that the higher voltage level Vdd1 (1.8V) is being coupled to the first terminal of tank capacitor 34.

One sees that, taking into account the voltage drop between the drain-source terminals of the MOS transistors, the tank capacitor may be charged with a voltage of about 1.7 Volts.

Regarding the negative portion of the dual charge pump, the latter works as follows. In a first phase, transistors 102 and 123 are switched ON, which results in the application of the first voltage Vdd1 (1.8V) between the first and second terminals of fly capacitor 32 and, in a subsequent second phase, transistors 102 and 123 are switched OFF while transistors 122 and 126 are switched ON so as to draw current to the ground and thus generate Vneg=−1.7 Volts.

This process is controlled by the application of appropriate control signals to the gate of transistors 101-102-111-125 and 122-123-126.

Charge pump 43 is arranged to provide, from the fixed positive voltage Vdd2 (assumed to have the lower voltage level) generated by the second SMPS (VDD_1.V2), the second higher voltage ±1.1V.

To achieve this, the dual charge pump operates as follows. Regarding the positive portion of the dual voltage charge pump, one can see that PMOS transistor 111 is switched ON (while transistors 101 and 125 are switched OFF), so that the voltage Vdd2 (1.2V) is being coupled to the first terminal of tank capacitor 31.

One sees that, taking into account the voltage drop between the drain-source terminals of the MOS transistors, the tank capacitor may be charged with a voltage of about 1.1 Volts.

Regarding the negative portion of the dual charge pump, the latter works as follows. In a first phase, transistors 112 and 123 are switched ON, which results in the application of the second source voltage Vdd2 (1.2V) between the first and second terminals of fly capacitor 32 and, in a subsequent second phase, transistors 112 and 123 are switched OFF while transistors 122 and 126 are switched ON so as to draw current to the ground and thus generate Vneg=−1.1 Volts.

As above, the process is controlled by the application of appropriate control signals to the gate of transistors 101-102-111-125 and 122-123-126.

Figure 6:
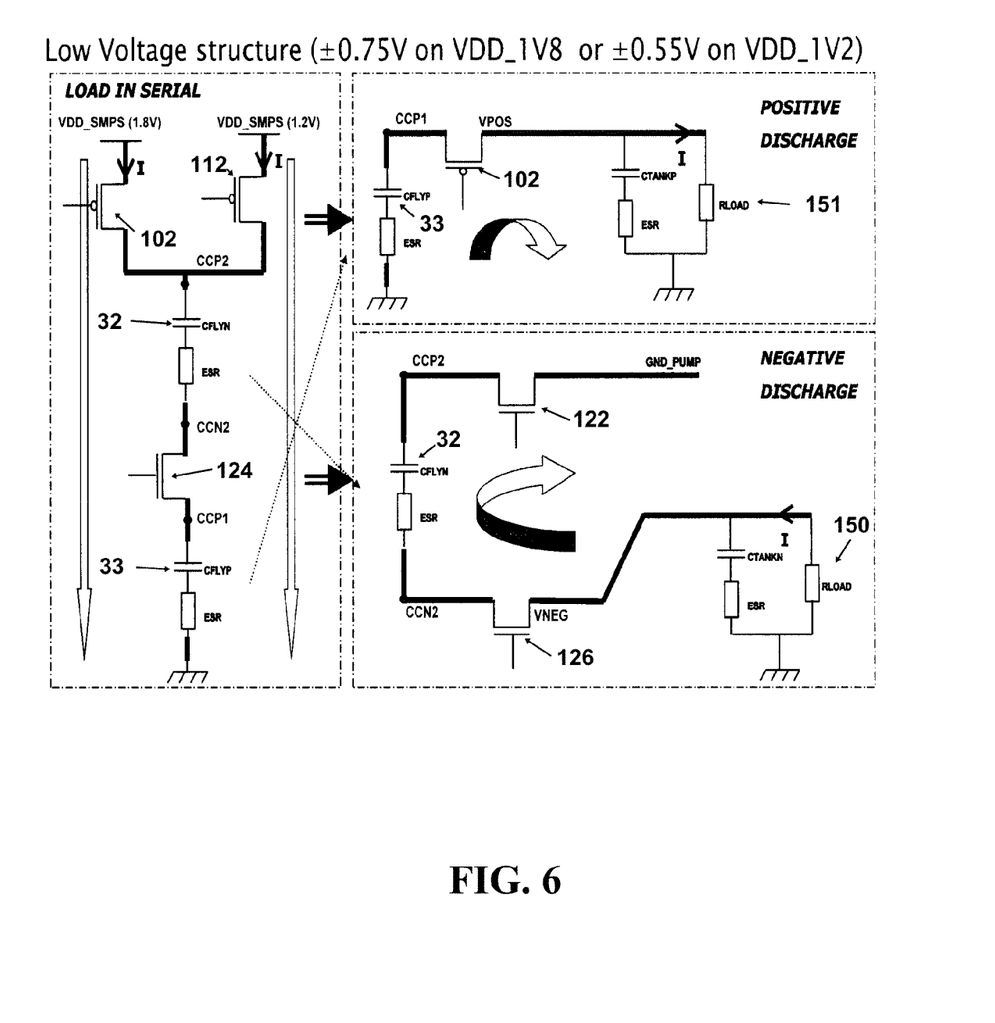
FIG. 6 illustrates the operation of the circuit of FIG. 4 to generate the two lower voltages.

Charge pump 43 is arranged to provide, from the fixed positive voltage Vdd1 generated by first SMPS (VDD_1.V8), the third voltage ±0.7V To achieve this, the dual charge pump operates as follows, as illustrated in FIG. 6. In a first phase, transistors 102 and 124 are switched ON while all other transistors are switched OFF, so as to establish a coupling in series of the two fly capacitors 32 and 33 between Vdd1 and the ground.

Such series coupling results in the fact that each fly capacitor is being charged to half the nominal value of 1.8V, that is to say approximately at 0.9V. Then, in a subsequent second phase, the transistors are switched OFF except, for the positive portion of the dual voltage charge pump, transistor 125 is switched ON so as to perform a charge transfer from fly capacitor 33 (carrying half the nominal value) to the Tank capacitor 34, and for the negative portion of the dual voltage charge pump, transistors 122 and 126 are switched ON so as to achieve a similar charge transfer to the tank capacitor 31.

This shows that, at the end of the second step, the tank capacitors can be charged so as to produce a low voltage of about ±0.7V.

As above, transistors 101-102-111-125 and 122-123-126 receive the application of adequate control signals so as to achieve the sequence of phases described above.

Charge pump 43 is arranged to provide, from the fixed positive voltage Vdd2 generated by the second SMPS (VDD_1.V8), the lowest voltage (in absolute value) ±0.5V. To achieve this, the dual charge pump operates as follows and as illustrated in FIG. 6.

In a first phase, transistor 112 and 124 are switched ON while other transistors are switched OFF, so as to establish a coupling in series of the two fly capacitors 32 and 33 between Vdd2 and the ground.

Such series coupling results in the fact that each fly capacitor is being charged to half the nominal value of 1.2V, that is to say approximately at 0.6V.

Then, in a subsequent second phase, transistors are switched OFF except, for the positive portion of the dual voltage charge pump, transistor 125 is switched ON so as to perform a charge transfer (of half the nominal value) from fly capacitor 33 to the tank capacitor 34 supplying current to the load 151, and for the negative portion of the dual voltage charge pump, transistors 122 and 126 are switched ON so as to achieve a similar charge transfer from fly capacitor 32 to the tank capacitor 31 supplying current to the load 150.

This shows that, at the end of the second step, the tank capacitors can be charged so as to produce a low voltage of about ±0.55V.

As above, transistors 101-102-111-125 and 122-123-126 receive the application of adequate control signals so as to achieve the sequence of phases described above.

Consequently, the circuit which was described in FIG. 4 shows great flexibility since it allows production of four distinctive voltage levels with a very low drop out and a very high efficiency, thus achieving a true H class audio amplifier without a dedicated SMPS circuit.

In particular, the generation of the different control signals applied to the gates of the transistors can be performed so as to control the generation of the low or high voltage in accordance with the actual level of an analog signal, thus achieving the voltage supply of an H class audio amplifier. In one particular embodiment, the playing of the audio file is slightly delayed so as to permit adequate signal processing and achieve the appropriate control of the set of switches 101-102-111-125 and 122-123-126 as the audio file is being played by the user.

To achieve this, there is a processing of the delayed audio file by a processor to enter into an analysis of the volume of the analog signal so as to generate the appropriate control signals for the gates of the transistors, helping to ensure adequate powering of the AB class audio amplifier.

It has been found that, thanks to this mechanism, it is possible to save about 3.5 mW on a typical audio file which would normally use about 10-12 mW.

Figure 7:
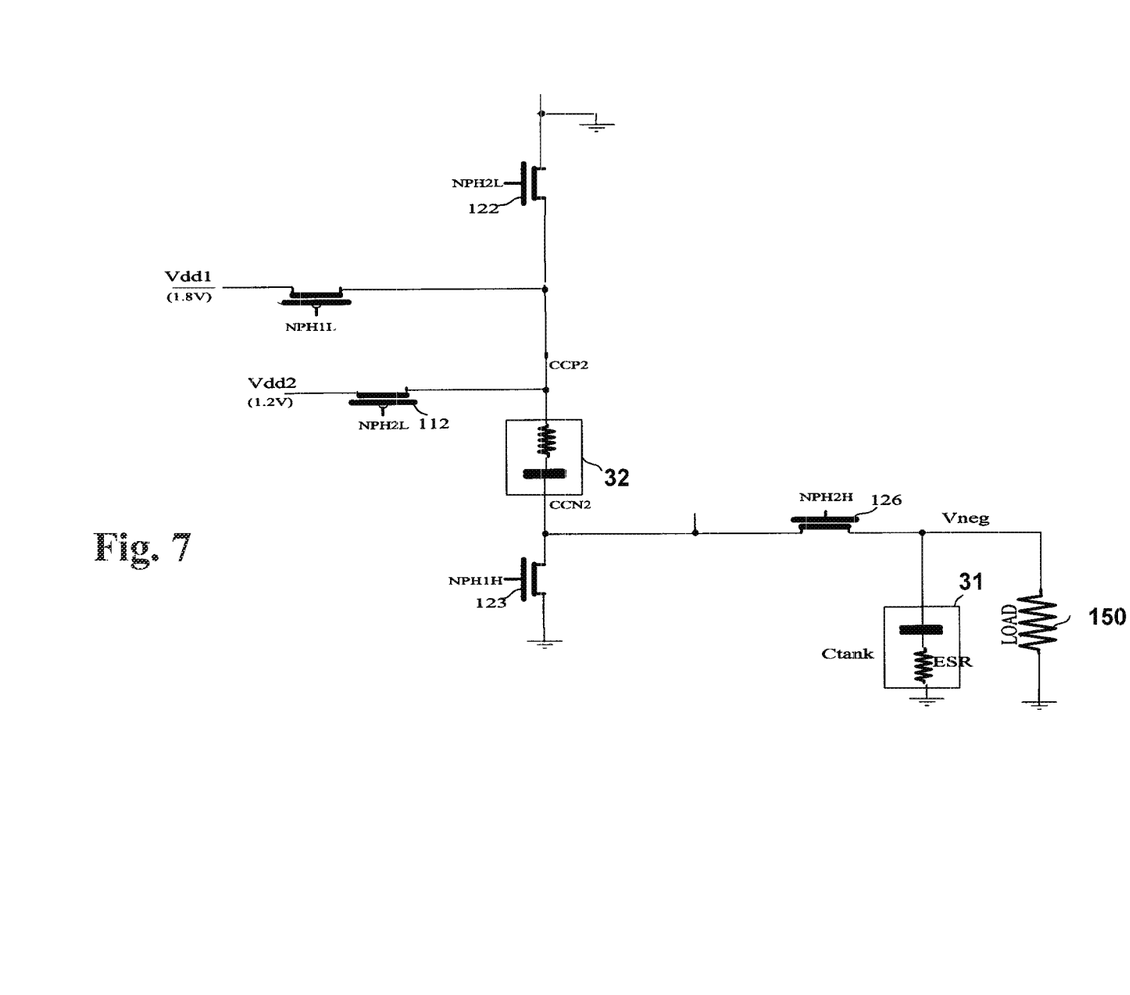
FIG. 7 illustrates an embodiment of a multi level charge pump circuit which can be used for generating negative voltage.

With respect to FIG. 7, there is now illustrated an embodiment of a multi level charge pump circuit which can be used for generating negative voltage. Such embodiment is based on the particular components illustrated in FIG. 4 which are involved for the generation of the negative voltage. Therefore, for the sake of clarity, the components which are common to those of FIG. 4 bear the same reference number.

One sees that the negative multilevel charge pump comprises one single fly capacitor 32 and one single tank capacitor 31, with the tank capacitor having an end coupled to the ground.

In addition, this circuit comprises a first PMOS transistor 102 having a source terminal coupled to the first power supply (Vdd1) and a drain terminal coupled to a first terminal of fly capacitor 32. The gate of first PMOS transistor 102 receives the first control signal (NPH1L).

This circuit further comprises a second PMOS transistor 112 which has a source terminal that is coupled to the second power supply (Vdd2), and a drain terminal that is coupled to the first terminal of fly capacitor 32. The gate terminal receives the second control signal (NPH2L).

This circuit also includes a first NMOS transistor 122 which has a source terminal coupled to ground and a drain terminal coupled to the first terminal of fly capacitor 32. The gate of the first NMOS transistor receives a third control signal (NPH2L).

This circuit additionally includes a second NMOS transistor 123 which has a source terminal coupled to ground, and a drain terminal coupled to the second terminal of fly capacitor 32. The gate terminal receives a fourth control signal (NPH1H).

Also included in the circuit is a third NMOS transistor 126 which has a source terminal that is coupled to the second terminal of fly capacitor 32 and a drain terminal that is coupled to the first terminal of the tank capacitor 31—which is in turn coupled in parallel to load 150. The gate of the third NMOS transistor for receives a fifth control signal (NPH2H).

This arrangement achieves the generation of different negative voltage levels by successive charge transfer from either the first power supply (Vdd1) or the second power supply (Vdd2) into fly capacitor 32, then followed by a corresponding transfer of charge into the tank capacitor 31.

What is claimed is:

1. An electronic device comprising:
    first and second tank capacitors;
    a charge pump having positive and negative outputs coupled to the first and second tank capacitors, respectively;
    the charge pump comprising
        a first fly capacitor coupled to the negative output and configured to transfer charge into the first tank capacitor,
        a second fly capacitor coupled to the positive output and configured to transfer charge to the second tank capacitor,
        first and second power supplies each for generating a positive voltage and a negative voltage, an absolute value of the positive voltage and the negative voltage generated by the first power supply being greater than an absolute value of the positive voltage and the negative voltage generated by the second power supply, and
        a set of switches configured to selectively couple the first and second fly capacitors in series, to transfer charge into the first and second fly capacitors, and to transfer charge to the first and second tank capacitors for generating a plurality of positive and negative voltage levels.

2. The electronic device of claim 1, wherein the plurality of positive voltages comprise the positive voltage from the first power supply, one half the positive voltage from the first power supply, the positive voltage from the second power supply, and one half the positive voltage from the second power supply; and wherein the plurality of negative voltages comprise the negative voltage from the first power supply, one half the negative voltage from the first power supply, the negative voltage from the second power supply, and one half the negative voltage from the second power supply.

3. An electronic device according to claim 1, wherein the first and second power supplies comprise switched mode power supplies.

4. An electronic device according to claim 1, wherein the first fly capacitor has a first and second terminals; wherein the second fly capacitor has a first and a second terminals, the second terminal being coupled to ground; wherein the first tank capacitor has a first and a second terminals, the second terminal being coupled to ground; wherein the second tank capacitor has a first and second terminals, the second terminal being coupled to ground; and further comprising:
    a first PMOS transistor having source, drain, and gate terminals, the source terminal of the first PMOS transistor being coupled to the first power supply, the drain terminal of the first PMOS transistor being coupled to the first terminal of the first fly capacitor, and terminal gate terminal configured to receive a first control signal,
    a second PMOS transistor having source, drain and gate terminals, the source terminal of the second PMOS transistor being coupled to the second power supply, the drain terminal of the second PMOS transistor being coupled to the first terminal of the first fly capacitor, and the gate terminal configured to receive a second control signal,
    a first NMOS transistor having source, drain and gate terminals, the source terminal of the first NMOS transistor being coupled to ground, the drain terminal of the first NMOS transistor being coupled to the first terminal of the first fly capacitor, and the gate terminal of the first NMOS transistor configured to receive a third control signal,
    a second NMOS transistor having source, drain and gate terminal terminals, the source terminal of the second NMOS transistor being coupled to ground, the drain terminal of the second NMOS transistor being coupled to the second terminal of the first fly capacitor, and the gate terminal for receiving a fourth control signal,
    a third NMOS transistor having source, drain and gate terminals, the source terminal of the third NMOS transistor being coupled to the second terminal of the first fly capacity, the drain terminal of the third NMOS transistor being coupled to the first terminal of the first tank capacitor, and the gate terminal of the third NMOS transistor being configured to receive a fifth control signal,
    a load coupled in parallel to the first tank capacitor,
    a fourth NMOS transistor having source, drain and gate terminals, the source terminal of the fourth NMOS transistor being coupled to the second terminal of the first fly capacitor, the drain terminal of the fourth NMOS transistor being coupled to the first terminal of the second fly capacitor, and the gate terminal being configured to receive a sixth control signal,
    a third PMOS transistor having source, drain and gate terminals, the source terminal of the third PMOS transistor being coupled to the first power supply, the drain terminal of the third PMOS transistor being coupled to the first terminal of the second tank capacitor, and the gate terminal being configured to receive a seventh control signal,
    a fourth PMOS transistor having source, drain, and gate terminals, the source terminal of the fourth PMOS transistor being coupled to the second power supply, the drain terminal of the fourth PMOS transistor being coupled to the first terminal of the second tank capacitor, and the gate terminal of the fourth PMOS transistor configured to receive an eighth control signal;
    a fifth PMOS transistor having source, drain, and gate terminals, the source terminal of the fifth PMOS transistor being coupled to the first terminal of the second fly capacitor, the drain terminal of the fifth PMOS transistor being coupled to the first terminal of the second tank capacitor, and the gate terminal of the fifth PMOS transistor configured to receive a ninth control signal; and
    the second tank capacitor being coupled in parallel to the load.

5. The electronic device according to claim 4, further comprising a control circuit configured to generate the first, second, third, fourth, fifth, sixth, seventh, eighth and ninth control signals.

6. The electronic device according to claim 1, wherein the electronic device is configured to define an H class audio device.

7. The electronic device according to claim 1, wherein the electronic device is configured to define a mobile telephone with audio features.

8. The electronic device according to claim 1, wherein the audio features comprise:
    a class H audio amplifier coupled to, and powered by, the charge pump;
    a processor configured to process a digital audio file; and
    a digital to analog converter coupled to the processor to convert the processed digital audio file into audio signals, and coupled to the class H audio amplifier so as to effectuate playback of the audio signals.

9. A method comprising:
coupling positive and negative outputs of a charge pump to first and second tank capacitors, respectively;
configuring a first fly capacitor to transfer charge into the first tank capacitor and to be coupled to the negative output;
configuring a second fly capacitor to transfer charge to the second tank capacitor and to be coupled to the positive output;
generating positive voltage and negative voltages using first and second power supplies, respectively, an absolute value of the positive voltage and the negative voltage generated by the first power supply being greater than an absolute value of the positive voltage and the negative voltage generated by the second power supply; and
selectively coupling the first and second fly capacitors in series, to transfer charge into the first and second fly capacitors, and to transfer charge to the first and second tank capacitors for generating a plurality of positive and negative voltage levels, using a set of switches.

10. The method of claim 9, wherein the plurality of positive voltages comprise the positive voltage from the first power supply, one half the positive voltage from the first power supply, the positive voltage from the second power supply, and one half the positive voltage from the second power supply; and wherein the plurality of negative voltages comprise the negative voltage from the first power supply, one half the negative voltage from the first power supply, the negative voltage from the second power supply, and one half the negative voltage from the second power supply.

11. The method of claim 10, further comprising:
coupling a second terminal of the second fly capacitor to ground;
coupling a second terminal of the first tank capacitor to ground;
coupling a second terminal of the second tank capacitor to ground;
coupling a source terminal of a first PMOS transistor being to the first power supply, a drain terminal of the first PMOS transistor to a first terminal of the first fly capacitor, and the terminal gate terminal to a first control signal;
coupling a source terminal of a second PMOS transistor to the second power supply, the drain terminal of the second PMOS transistor to a first terminal of the first fly capacitor, and the gate terminal to a second control signal;
coupling a source terminal of a first NMOS transistor to ground, a drain terminal of the first NMOS transistor to the first terminal of the first fly capacitor, and the gate terminal of the first NMOS transistor to a third control signal;
coupling a source terminal of a second NMOS transistor to ground, a drain terminal of the second NMOS transistor to the second terminal of the first fly capacitor, and the gate terminal to a fourth control signal;
coupling a source terminal of a third NMOS transistor to the second terminal of the first fly capacitor, a drain terminal of the third NMOS transistor to a first terminal of the first tank capacitor, and a gate terminal of the third NMOS transistor to a fifth control signal;
coupling a load in parallel to the first tank capacitor;
coupling a source terminal of a fourth NMOS transistor to the second terminal of the first fly capacitor, the drain terminal of the fourth NMOS transistor to the first terminal of the second fly capacitor, and the gate terminal to a sixth control signal;
coupling a source terminal of a third PMOS transistor to the first power supply, a drain terminal of the third PMOS transistor to the first terminal of the second tank capacitor, and a gate terminal of the third PMOS transistor to a seventh control signal;
coupling a source terminal of a fourth PMOS transistor to the second power supply, a drain terminal of the fourth PMOS transistor to the first terminal of the second tank capacitor, and a gate terminal of the fourth PMOS transistor to an eighth control signal;
coupling a source terminal of a fifth PMOS transistor to the first terminal of the second fly capacitor, a drain terminal of the fifth PMOS transistor being to the first terminal of the second tank capacitor, and a gate terminal of the fifth PMOS transistor to a ninth control signal; and
coupling the second tank capacitor in parallel to the load.

12. A method according to claim 11, further comprising configuring a control circuit to generate the first, second, third, fourth, fifth, sixth, seventh, eighth and ninth control signals.

13. A method according to claim 12, wherein the positive voltage of the first power supply is generated by switching the third PMOS transistor on such that the positive voltage of the first power supply is coupled to the first terminal of the tank capacitor; and wherein the negative voltage of the first power supply is generated by, in a first phase, switching the first PMOS transistor and the second NMOS transistor on so as to charge the first fly capacitor, and in a second phase, by switching the first PMOS transistor and the second NMOS transistor off and switching the NMOS transistor and the third NMOS transistor on so as to draw current to the ground.

14. A method according to claim 12, wherein the positive voltage of the second power supply are generated by switching the fourth PMOS transistor on such that the positive voltage of the second power supply is coupled to the first terminal of the first tank capacitor; and wherein the negative voltage of the second power supply is generated by, in a first phase, switching the second PMOS transistor and the second NMOS transistor on so as to charge the first fly capacitor, and in a second phase, by switching the first PMOS transistor and the second NMOS transistor off and switching the first NMOS transistor and the third NMOS transistor on so as to draw current to the ground.

15. A method according to claim 12, wherein one half the positive voltage of the first power supply is generated by, in a first phase, switching the first PMOS transistor and the fourth NMOS transistor on such that a series coupling of the first and second fly capacitors between the positive voltage of the first power supply and ground is made, and in a second phase, by switching the fifth PMOS transistor on such that charge is transferred from the second fly capacitor into the second tank capacitor; and wherein one half the negative voltage of the first power supply is generated by, in a first phase, switching the first PMOS transistor and the fourth NMOS transistor on such that a series coupling of the first and second fly capacitors between the positive voltage of the first power supply and ground is made, and in a second phase, and in a second phase, by switching the first NMOS transistor and the third NMOS transistor on so as to transfer charge from the first fly capacitor into the first tank capacitor.

16. A method according to claim 12, wherein the positive voltage of the second power supply is generated by, in a first phase, switching the second PMOS transistor and the fourth NMOS transistor on so as to couple the first and second fly capacitors in series between the positive voltage of the second power supply and ground, and in a second phase, by switching the fifth PMOS transistor on so as to transfer charge from the second fly capacitor into the second tank capacitor; and wherein the negative voltage of the second power supply is generated by, in a first phase, switching the second PMOS transistor and the fourth NMOS transistor on so as to couple the first and second fly capacitors in series between the positive voltage of the second power supply and ground, and in a second phase, by switching the first NMOS transistor and the third NMOS transistor on so as to transfer charge from the first fly capacitor to the first tank capacitor.

17. An article comprising:
  first and second power supplies;
  a fly capacitor having first and second terminals;
  a tank capacitor having first and second terminals, the second terminal of the tank capacitor being coupled to ground;
  a first PMOS transistor having source, drain, and gate terminals, the source terminal of the first PMOS transistor being coupled to the first power supply, the drain terminal of the first PMOS transistor being coupled to the first terminal of the fly capacitor, and the gate terminal of the first PMOS transistor configured to receive a first control signal;
  a second PMOS transistor having source, drain, and gate terminals, the source terminal of the second PMOS transistor being coupled to the second power supply, the drain terminal of the second PMOS transistor being coupled to the first terminal of the fly capacitor, and the gate terminal of the second PMOS transistor configured to receive a second control signal;
  a first NMOS transistor having source, drain, and gate terminals, the source terminal of the first NMOS transistor being coupled to ground, the drain terminal of the first NMOS transistor being coupled to the first terminal of the fly capacitor, and the gate terminal of the first NMOS transistor configured to receive a third control signal;
  a second NMOS transistor having source, drain, and gate terminals, the source terminal of the second NMOS transistor being coupled to ground, the drain terminal of the second NMOS transistor being coupled to the second terminal of the fly capacitor, and the gate terminal of the second NMOS transistor being configured to receive a fourth control signal;
  a third NMOS transistor having source, drain, and gate terminals, the source terminal of the third NMOS transistor being coupled to the second terminal of the fly capacitor, the drain terminal of the third NMOS transistor being coupled to the first terminal of the tank capacitor, and the gate terminal of the third NMOS transistor configured to receive a fifth control signal; and
  a load coupled in parallel to the tank capacitor.

* * * * *